(12) United States Patent

Hayashi et al.

(10) Patent No.: US 7,451,465 B2
(45) Date of Patent: Nov. 11, 2008

(54) OPTICAL PICKUP DEVICE

(75) Inventors: Ryuuji Hayashi, Daito (JP); Nobuyuki Okazaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 420 days.

(21) Appl. No.: 11/405,484

(22) Filed: Apr. 18, 2006

(65) Prior Publication Data

US 2006/0236330 A1    Oct. 19, 2006

(30) Foreign Application Priority Data

Apr. 19, 2005   (JP) .............................. 2005-121622

(51) Int. Cl.
*G11B 7/08*       (2006.01)
(52) U.S. Cl. .................. 720/675; 720/676; 720/678; 720/679
(58) Field of Classification Search ............... 720/675, 720/676, 677, 678, 679; 369/223, 224, 244, 369/249.1
See application file for complete search history.

(56) References Cited

U.S. PATENT DOCUMENTS

| 5,687,159 | A  | * | 11/1997 | Kim ............................. 720/677 |
| 6,351,444 | B1 | * | 2/2002 | Sogawa et al. ................ 720/676 |
| 6,483,798 | B1 | * | 11/2002 | Wu ............................. 720/676 |
| 6,795,971 | B2 | * | 9/2004 | Lin ............................. 720/679 |
| 7,328,444 | B2 | * | 2/2008 | Izumisawa et al. ............ 720/675 |
| 2004/0027977 | A1 | * | 2/2004 | Kojima et al. ................ 369/244 |
| 2005/0081225 | A1 | * | 4/2005 | Tanimoto et al. ............. 720/676 |
| 2006/0095932 | A1 | * | 5/2006 | Hara ............................. 720/677 |
| 2006/0190953 | A1 | * | 8/2006 | Nakashima et al. ........... 720/676 |

FOREIGN PATENT DOCUMENTS

| CN | 2438207 Y   | 7/2001 |
| JP | A-2003-346351 | 12/2003 |

* cited by examiner

*Primary Examiner*—Tianjie Chen
(74) *Attorney, Agent, or Firm*—Morgan Lewis & Bockius LLP

(57) ABSTRACT

An optical pickup device is provided that permits, with an inexpensive construction, adjustment of the parallelism of a pair of guide rods for guiding an optical head relative to a recording surface of an optical disc. The guide rods 2 receive, from twist coil springs 5 fitted to a chassis, an elastic restoring force and are thereby loaded with a force that tends to move the guide rods 2 away from the recording surface of the optical disc. At a position close to each of at least three of a total of four ends 2a of the guide rods 2, an adjustment screw 5 is fitted to the chassis by being screw-engaged into a nut 6 so as to, when rotated, move close to and away from the recording surface of the optical disc. The position in which the guide rods 2 remain loaded with the force is determined as a result of the outer circumference of the guide rods 2 at the at least three ends 2a thereof making contact with a flat inner end face 5aa on the head portion 5a of each of the adjustment screws 5.

4 Claims, 2 Drawing Sheets

OPTICAL PICKUP DEVICE

This application is based on Japanese Patent Application No. 2005-121622 filed on Apr. 19, 2005, the contents of which are hereby incorporated by reference.

BACKGROUND OF THE INVENTION

1. Field of the Invention

The present invention relates to an optical pickup device for reproducing and recording information from and to an optical disc such as a CD (compact disc) or DVD (digital versatile disc) used as an information recording medium.

2. Description of Related Art

An optical pickup device is provided with an optical head that shines laser light on a recording surface of a rotating optical disc to write information to the recording surface (thus to perform recording) and that receives the laser light reflected from the recording surface of the optical disc to read information from the recording surface (thus to perform reproduction). Here, during the reproduction and recording of information from and to the optical disc, the optical head moves so as to reciprocate across the recording surface of the optical disc in the direction of a radius thereof. This reciprocating movement is generally guided by a pair of guide rods supported on a chassis. Thus, whether reproduction and recording can be performed with high accuracy depends greatly on how parallel the guide rods are to the recording surface of the optical disc. For this reason, in a common optical pickup device, to permit adjustment of the parallelism just mentioned, the guide rods are supported on the chassis in such a way that their height can be adjusted.

An example of a conventional structure that permits adjustment of the height of the guide rods is shown in FIG. 4. It should be noted that, although in reality each guide rod has two ends (both ends) and thus a pair of guide rods has four ends in total, FIG. 4 shows a part around only one of them, as a representative of all the four.

As shown in FIG. 4, on a chassis (unillustrated), near an end 102a of a guide rod 102, a twist coil spring 104 is fitted. Through a coil portion 104a of this twist coil spring 104, the guide rod 102 is placed. Both end portions 104b of the twist coil spring 104 that extend outward therefrom are hooked on the chassis, and thereby the twist coil spring 104 is fitted to the chassis. In this way, the resilient restoring force of the twist coil spring 104 is applied to the guide rod 102, and thus the guide rod 102 is kept loaded with a force that tends to move the guide rod 102 away (downward in FIG. 4) from the recording surface of the optical disc (located above in FIG. 4) as indicated by a solid-line arrow in FIG. 4.

Also on the chassis, near the end 102a of the guide rod 102, a special screw 105 is fitted. By being rotated, this special screw 105 moves closer to and away from the recording surface of the optical disc. This special screw 105 has a flat end face 105aa, with which the part of the outer circumferential face of the guide rod 102 near the end 102a thereof makes contact. This restricts the movement of the guide rod 102 in the direction in which it is loaded with the force, and thereby determines the position, and hence the height, of the part of the guide rod 102 near the end 102a thereof. The special screw 105 is fitted to the chassis by being screw-engaged into a threaded hole that is formed by tapping or otherwise processing the chassis, which is molded of synthetic resin such as polyphenylene ether (PPE). By a bracket formed on the chassis, the guide rod 102 is guided to be movable in the direction in which it is loaded with the force, and is prevented from moving in other directions (such as the direction perpendicular to the plane of the figure in FIG. 4).

Likewise, near each of the other three ends 102a of the guide rods 102, a twist coil spring 104 and a special screw 105 are fitted.

In the construction described above, by rotating the special screws 105 individually to screw them in and out and thereby move them forward and backward, it is possible to adjust the height of the guide rod 102 near each end 102a thereof. This permits the guide rods 102 to be adjusted to be properly parallel to the recording surface of the optical disc.

In another example of a conventional structure that permits adjustment of the height of the guide rods, a pair of plate springs is provided to load with a force the part of the guide rods close to each end 102a thereof, and a special screw is provided that, by being rotated, moves closer to and away from the recording surface of the optical disc (this screw moves forward and backward in the same direction as the special screw 105 described above) (see, for example, JP-A-2003-346351). Here, the special screw has a head portion with a wide extending circumferential rim. With the outer end face of the circumferential rim, the part of the outer circumferential face of a guide rod 102 near an end 102a thereof makes contact. This permits the height of the guide rod 102 near each end 102a thereof to be determined.

On the other hand, in recent years, optical pickup devices have been required to be increasingly inexpensive. Disadvantageously, however, the conventional guide rod height adjustment constructions described above both require special screws that are fabricated for dedicated purposes and that are thus difficult to obtain in the ordinary market. This greatly limits the possibility of cost reduction for the following reasons. In the special screw 105 used in the first example of the conventional guide rod height adjustment constructions described above, the end face 105aa, which makes contact with a guide rod 102, is required to offer a high degree of perpendicularity relative to the rotation center axis (this is not much the case with screws fabricated for general purposes). On the other hand, in the special screw used in the second example, to permit it to make contact with a guide rod 102, at the head portion of the screw, a wide extending circumferential rim needs to be formed (which is unlikely to be found in screws fabricated for general purposes).

Incidentally, in the second example of the conventional guide rod height adjustment constructions described above, the guide rod 102 is held in position by plate springs and special screws. Thus, the outer circumferential face of a guide rod 102 may accidentally slip off the outer end face of the head portion of the special screw, causing the guide rod 102 to drop off.

SUMMARY OF THE INVENTION

In view of the conventionally encountered inconveniences mentioned above, it is an object of the present invention to provide an optical pickup device that permits, with an inexpensive construction, adjustment of the parallelism of guide rods for guiding an optical head relative to a recording surface of an optical disc.

To achieve the above object, according to the present invention, in an optical pickup device including an optical head that, while being guided by a pair of guide rods supported on a chassis, moves so as to reciprocate across a recording surface of an optical disc in the direction of a radius thereof, the guide rods receive, from an elastic member fitted to the chassis, the restoring force of the elastic member and are thereby loaded with a force that tends to move the guide rods away from the recording surface of the optical disc. Moreover, at a position close to each of at least three of a total of four ends of the guide rods, an adjustment screw is fitted to the chassis so as to, when rotated, move close to and away from the recording surface of the optical disc, so that the position in which the guide rods remain loaded with the force is determined as a result of the outer circumference of the guide rods at the at least three ends thereof making contact with a flat inner end face on the head portion of each of the adjustment screws.

With this construction, by rotating the screws individually to screw them in and out and thereby move them forward and backward, and thereby adjusting the height of the guide rods individually near the corresponding ends thereof making contact with the inner end faces of the head portions of he screws, it is possible to adjust the guide rods to make them properly parallel to the recording surface of the optical disc. In addition, the adjustment of the parallelism of the guide rods here can be achieved inexpensively by the use of screws having a head portion with a flat inner end face that are widely available on the ordinary market. Incidentally, the adjustment of the parallelism of the guide rods relative to the recording surface of the optical disc can be achieved by adjusting the height of the guide rods near at least three of a total of four ends thereof relative to the fourth. That is, the guide rods may be supported fixedly near one end thereof.

From the viewpoint of reducing the fabrication cost of the cassis in particular, it is preferable that the chassis be molded of synthetic resin, and that the screws be fitted to the chassis by being screw-engaged into nuts held on the chassis.

From the viewpoint of stably keeping in position the guide rods loaded with the force, it is preferable that the elastic member be fitted one near each of the at least three ends of the guide rods close to the screws.

From the viewpoint of practicality, it is preferable that the elastic member be a twist coil spring, through a coil portion of which a part of the guide rods is placed, and whose both end portions extend outward from the coil portion so as to be hooked at hook holders formed in the chassis.

With an optical pickup device according to the present invention, the adjustment of the parallelism of a pair of guide rods for guiding an optical head relative to a recording surface of an optical disc can be realized by the use of inexpensive screws. This makes it possible to reduce the cost of the optical pickup device.

DETAILED DESCRIPTION OF PREFERRED EMBODIMENTS

Figure 1:
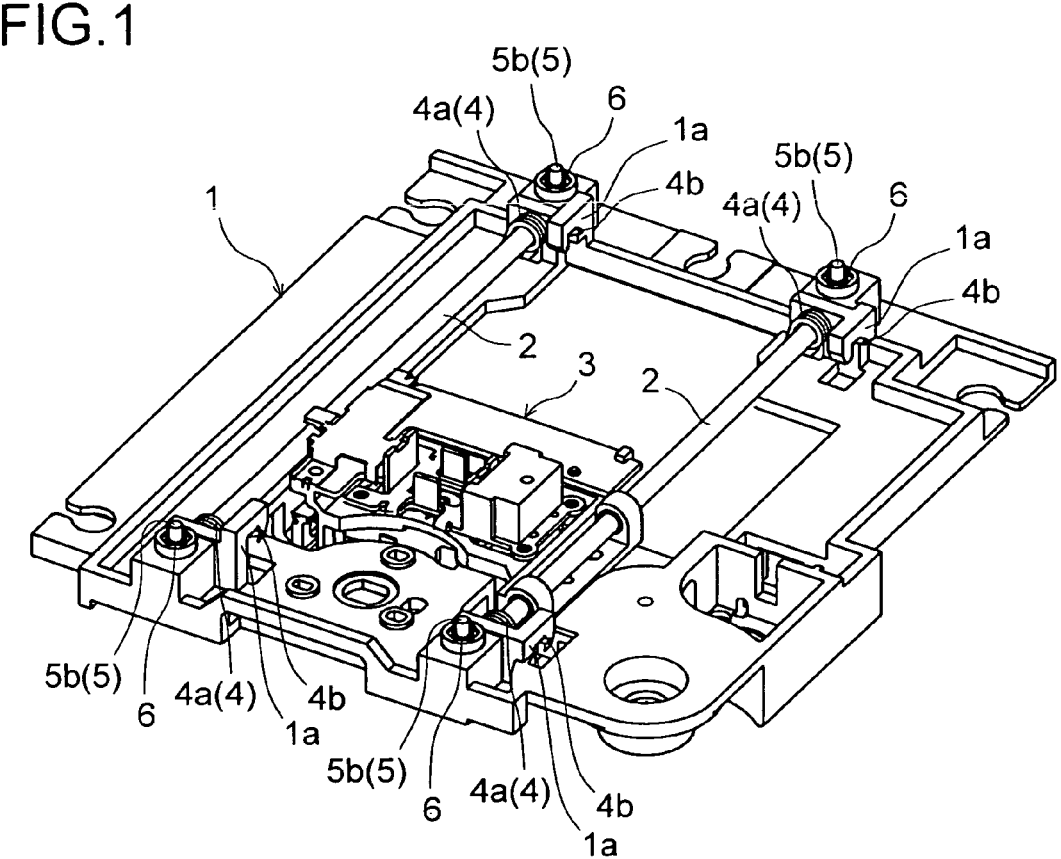
FIG. 1 is a perspective view, as seen from top, of a chassis having a pair of guide rods supported thereon in the optical pickup device embodying the present invention.
Figure 2:
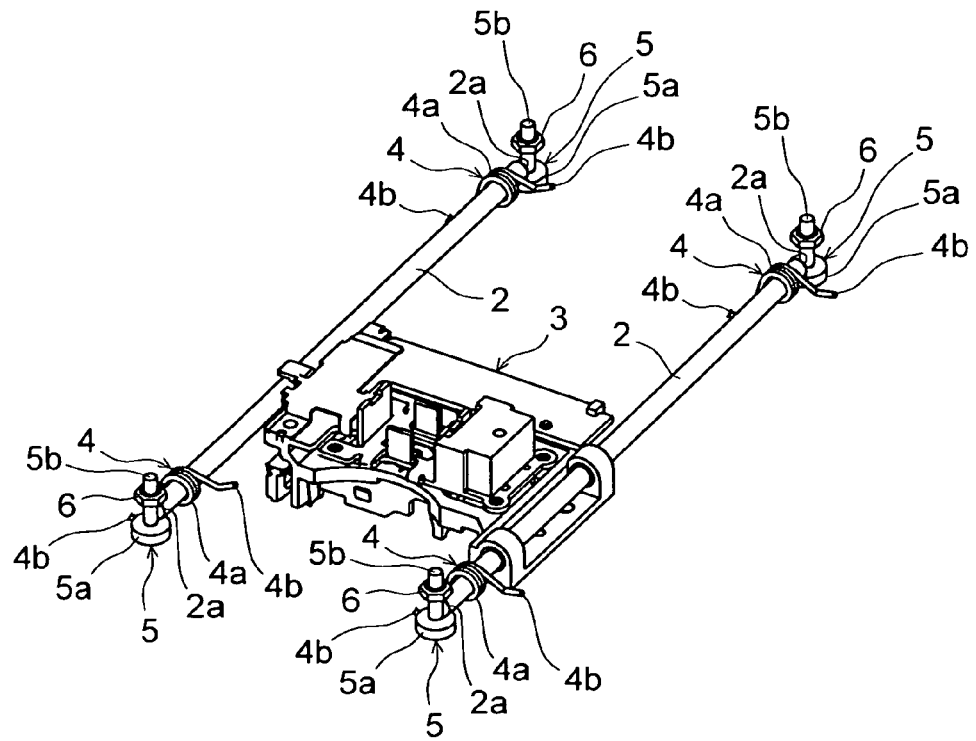
FIG. 2 is a perspective view the same as FIG. 1 but with the chassis omitted.
Figure 3:
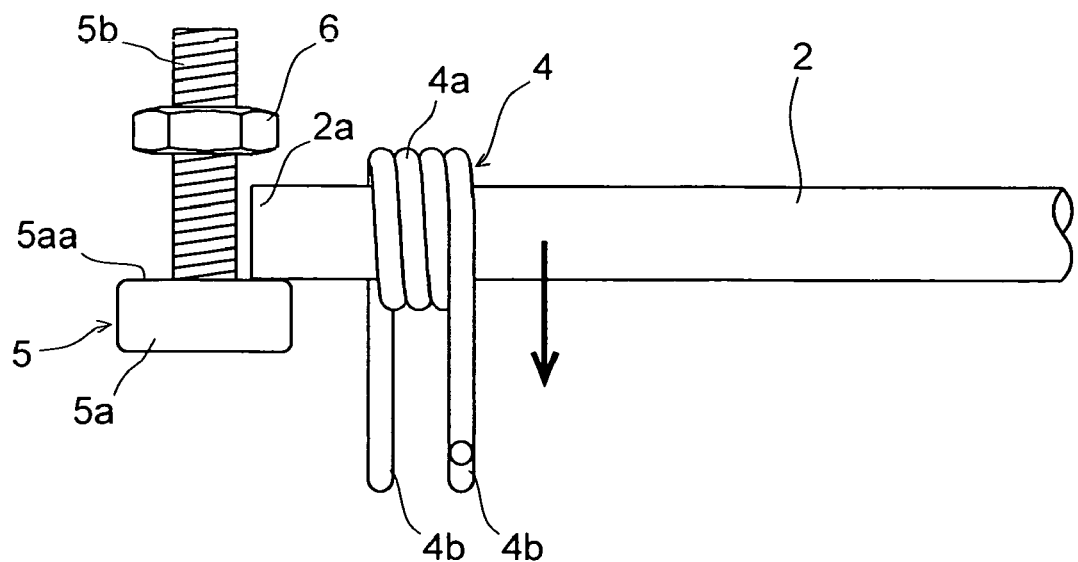
FIG. 3 is a side view of a principal part of the guide rod height adjustment construction in the optical pickup device shown in FIGS. 1 and 2, showing it with the chassis omitted.
Figure 4:
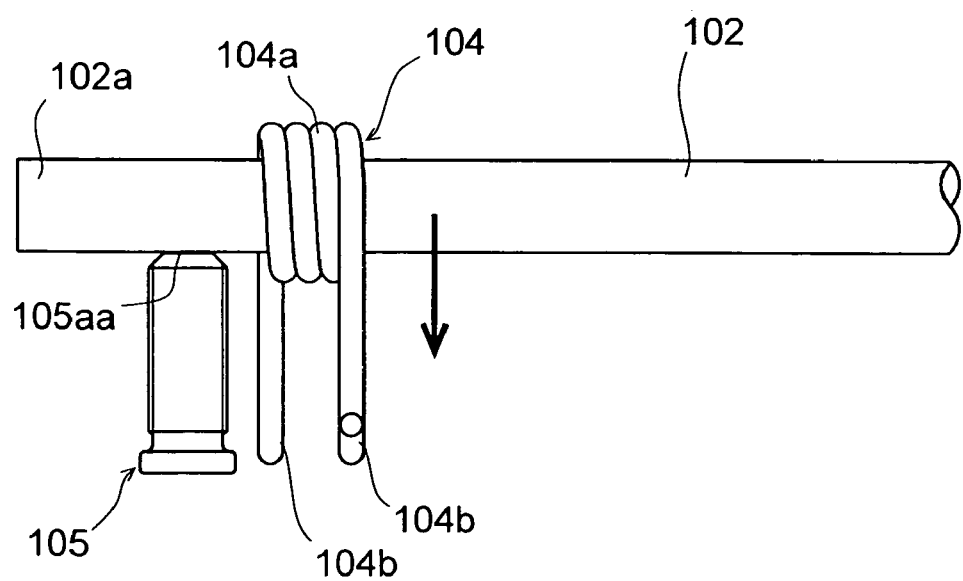
FIG. 4 is a side view of a principal part of the guide rod height adjustment construction used in a conventional optical pickup device, showing it with the chassis omitted.

Hereinafter, an optical pickup device embodying the present invention will be described in detail with reference to the accompanying drawings. FIG. 1 is a perspective view, as seen from top, of a chassis having a pair of guide rods supported thereon in the optical pickup device embodying the present invention. FIG. 2 is a perspective view the same as FIG. 1 but with the chassis omitted. FIG. 3 is a side view of a principal part of the guide rod height adjustment construction in the optical pickup device, showing it with the chassis omitted. It should be noted that FIG. 3 shows a part around only one of the two (both) ends of each guide rod, that is, only one end of a total of four ends of the guide rods, as a representative of all the four.

The optical pickup device embodying the invention is provided with: a chassis 1; a pair of guide rods 2 that are supported on the chassis 1 in such a way that their height can be adjusted; and an optical head 3 that, while being guided by the guide rods 2, moves so as to reciprocate across a recording surface of an optical disc in the direction of a radius thereof. The optical head 3 is composed essentially of: a light source such as a semiconductor laser that emits laser light; a photodetector such as a photodiode that receives and detects the laser light emitted from the light source and then reflected from the optical disc and that then converts it into an electrical signal; an optical system, including a diffraction grating, a half-mirror, and an objective lens for example, that guides the laser light from the light source so that it is reflected on the optical disc to reach the photodetector; and a base member on which these components are mounted and that is driven to move. In FIGS. 1 and 2, the base member is shown as representing the whole optical head 3.

Next, the guide rod height adjustment construction used in this embodiment will be described. On the chassis 1, near each end 2a of the guide rods 2, a twist coil spring is fitted. Through a coil portion 4a of this coil spring 4, a part of the guide rods 2 is placed. Both end portions 4b of the coil spring 4 that extend from the coil portion 4a thereof are hooked at hook holders 1a (see FIG. 1) formed in the chassis 1, and thereby the coil spring 4 is fitted to the chassis. The chassis 1 is molded of synthetic resin such as polyphenylene ether (PPE), and the hook holders 1a are molded integrally with the chassis 1. Thus, the guide rods 2 receive an elastic restoring force acting relative to both end portions 4b of the coil springs 4, and are thereby stably loaded with a force that tends to move the guide rods 2 away (downward in FIG. 3) from the recording surface of the optical disc (located above in FIG. 3) as indicated by a solid-line arrow in FIG. 3.

Moreover, on the chassis 1, close to each end 2a of the guide rods 2, an adjustment screw 5 is fitted that, by being rotated, moves closer to and away from the recording surface of the optical disc. Used as this adjustment screw 5 is one, as widely available in the ordinary market, composed of a head portion 5a and a threaded shaft portion 5b, wherein the head portion 5a has a flat inner end face 5aa. With the flat inner end face 5aa of the head portion 5a of the adjustment screw 5, the outer circumferential face of the guide rods 2 makes contact. This restricts the movement of the guide rods 2 in the direction in which they are loaded with the force, and thereby determines the position, and hence the height, of the guide rods 2 near the end 2a thereof. By a bracket formed on the chassis, the guide rods 2 are guided to be movable in the direction in which they are loaded with the force, and are prevented from moving in other directions (such as the direction perpendicular to the plane of the figure in FIG. 3).

What deserves special attention here is that the adjustment screw 5 is fitted to the chassis 1 as a result of the threaded shaft portion 5b being screw-engaged into a nut 6 that is held by being fitted into a dimple formed integrally with the chassis 1. This eliminates the need to tap or otherwise process the chassis to form therein a screw hole as is needed to fit a special screw 105 in the conventional guide rod height adjustment constructions, and is thus expected to contribute to lower cost.

Likewise, also near each of the other three ends 2*a* of the guide rods 2, a twist coil spring 4 and a screw 5 are fitted.

With this construction, by rotating the screws 5 individually to screw them in and out and thereby move them forward and backward, and thereby adjusting the height of the guide rods 2 individually near the corresponding ends 2*a* thereof making contact with the inner end faces 5*aa* of the head portions 5*a* of he screws 5, it is possible to adjust the guide rods 2 to make them properly parallel to the recording surface of the optical disc. In addition, the adjustment of the parallelism of the guide rods 2 here can be achieved inexpensively by the use of screws 5 that are widely available on the ordinary market. This helps reduce the cost of the optical pickup device. Moreover, since the guide rods 2 are held by the coil springs 4, the screws 5, and the brackets formed in the chassis, it never occurs that the outer circumferential face of the guide rod 2 accidentally slips off the inner end faces 5*aa* of the head portions 5*a* of the screws 5.

Incidentally, the adjustment of the parallelism of the guide rods 2 relative to the recording surface of the optical disc can be achieved by adjusting the height of the guide rods 2 near at least three of a total of four ends 2*a* thereof relative to the fourth end 2*a*. Thus, the guide rods 2 may be supported fixedly near one end 2*a* thereof, with no coil spring 4 or screw 5 provided near that one end 2*a*.

The present invention may be carried out in any manners other than specifically described above, and many modifications and variations are possible within the spirit of the present invention. For example, so long as the guide rods 2 can receive an elastic restoring force so as to be loaded with a force that tends to move them away from the recording surface of the optical disc, the coil springs 4 may be replaced with other elastic members such as plate springs. These elastic members may be fitted elsewhere than near the ends 2*a* of the guide rods 2. The screws 5 may be fitted to the chassis 1 otherwise than by being screw-engaged into the nuts 6; they may be screw-engaged into threaded holes formed by tapping or otherwise processing the chassis 1 as in the conventional guide rod height adjustment constructions.

Obviously, many modifications and variations of the present invention are possible in light of the above teachings. It is therefore to be understood that within the scope of the appended claims, the invention may be practiced other than as specifically described.

What is claimed is:

1. An optical pickup device including an optical head that, while being guided by a pair of guide rods supported on a chassis, moves so as to reciprocate across a recording surface of an optical disc in a direction of a radius thereof,
    wherein
    the guide rods receive, from an elastic member fitted to the chassis, a restoring force of the elastic member and are thereby loaded with a force that tends to move the guide rods away from the recording surface of the optical disc, and
    at a position close to each of at least three of a total of four ends of the guide rods, an adjustment screw is fitted to the chassis so as to, when rotated, move close to and away from the recording surface of the optical disc, so that a position in which the guide rods remain loaded with the force is determined as a result of an outer circumference of the guide rods at the at least three ends thereof making contact with a flat inner end face on a head portion of each of the adjustment screws.

2. The optical pickup device of claim 1,
    wherein the chassis is molded of synthetic resin, and the screws are fitted to the chassis by being screw-engaged into nuts held on the chassis.

3. The optical pickup device of claim 1,
    wherein the elastic member is fitted one near each of the at least three ends of the guide rods close to the screws.

4. The optical pickup device of claim 1,
    wherein the elastic member is a twist coil spring, through a coil portion of which a part of the guide rods is placed, and whose both end portions extend outward from the coil portion so as to be hooked at hook holders formed in the chassis.

\* \* \* \* \*